United States Patent [19]

Cox et al.

[11] Patent Number: 4,700,141

[45] Date of Patent: Oct. 13, 1987

[54] DEEP PENETRATION WELL LOGGING SONDE

[75] Inventors: Percy T. Cox; Wayne F. Warren; Theodore W. Nussbaum, all of Houston, Tex.

[73] Assignee: Texaco Inc., White Plains, N.Y.

[21] Appl. No.: 826,532

[22] Filed: Feb. 6, 1986

Related U.S. Application Data

[62] Division of Ser. No. 480,641, Mar. 31, 1985, Pat. No. 4,594,551.

[51] Int. Cl.$^4$ .......................... G01V 3/30; G01V 3/18
[52] U.S. Cl. ..................................... 324/341; 324/338
[58] Field of Search ................ 324/330, 339, 340, 341

[56] References Cited

U.S. PATENT DOCUMENTS

| | | | |
|---|---|---|---|
| 4,107,598 | 8/1978 | Meador et al. | 324/338 |
| 4,185,238 | 1/1980 | Huchital et al. | 324/338 |
| 4,338,567 | 7/1982 | Coates | 324/338 |

Primary Examiner—Reinhard J. Eisenzopf
Assistant Examiner—Walter E. Snow
Attorney, Agent, or Firm—Robert A. Kulason; Ronald G. Gillespie

[57] ABSTRACT

A well logging system and method of the present invention determines the dielectric constant and/or conductivity of earth formations some of which have fluid invasion. The system and method of the present invention include the transmission of electromagnetic energy into the earth formations from a first location in a borehole in the formations at a frequency which enables the electromagnetic energy to propagate throughout the surrounding earth formations. Electromagnetic energy is received by receivers at three locations in the borehole which are spaced longitudinally from the location of the transmission of the electromagnetic energy. The receivers provide signals representative of the received electromagnetic energy. The dielectric constant and/or resistivity of the earth formations are determined in accordance with the signals from the three receivers.

2 Claims, 4 Drawing Figures

DEEP PENETRATION WELL LOGGING SONDE

This is a division of application Ser. No. 480,641 filed Mar. 31, 1985 since issued as U.S. Pat. No. 4,594,551 on June 10, 1986.

BACKGROUND OF THE INVENTION

Field of the Invention

The present invention relates to dielectric constant and/or conductivity well logging systems and methods in general and, more particularly, to well logging systems and methods for determining the dielectric constant and/or conductivity of earth formations, some of which have been invaded by a drilling fluid.

SUMMARY OF THE INVENTION

Well logging apparatus and methods determine the dielectric constant and/or conductivity of earth formations, some of which have drilling fluid invasion in the vicinity of a well borehole. The system and method of the present invention provides transmission of electromagnetic energy into the earth formations by a transmitter at a first location in the borehole at a frequency which enables the electromagnetic energy to propagate throughout the surrounding earth formations. Electromagnetic energy is received at three locations by three receivers in the borehole spaced longitudinally from the transmitter's location. The three receivers provide signals representative of the received electromagnetic energy. The dielectric constant and/or resistivity of the earth formations are determined in accordance with the signals from the receiving means.

The objects and advantages of the invention will appear more fully hereinafter from a consideration of the detailed description which follows, taken together with the accompanying drawings, wherein two embodiments of the inventions are illustrated by way of example. It is to be expressly understood, however, that the drawings are for illustration purposes only and are not to be construed as defining the limits of the invention.

DESCRIPTION OF THE INVENTION

The problem of investigating underground formations from a borehole in which there is a zone in the formation invaded by a drilling fluid and a non-invaded zone in the formation, has been discussed in U.S. Pat. No. 4,185,238. That patent discloses a dielectric and resistivity well logging system utilizing a transmitter coil with four receiver coils spaced longitudinally from the transmitter coil and having spacings of twenty-seven inches, fifty-two inches, seventy-five inches and one hundred inches from the transmitter coil. The present invention is capable of investigating invaded and non-invaded zones utilizing only three receiver coils.

Figure 1:
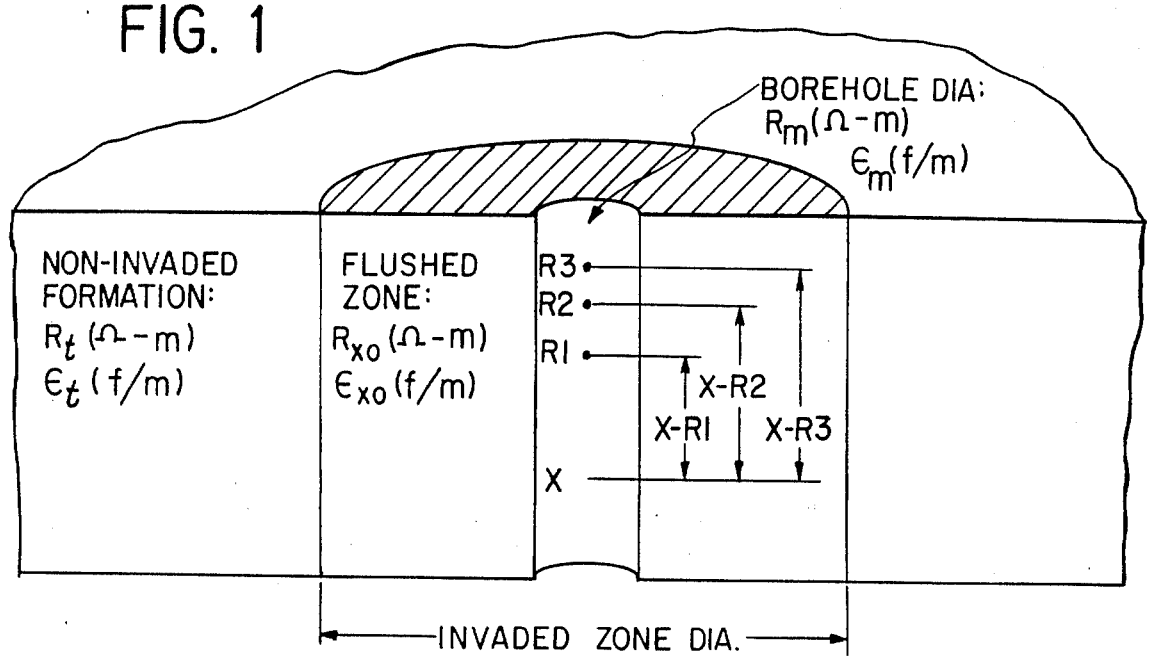
FIG. 1 is a graphical representation of a drilling fluid invasion model of an earth formation with a borehole.

Referring to FIG. 1, there is a diagram of an invasion model showing the relationship of a single transmitter - three receiver well logging system. There are in essence three zones, one being the borehole itself, a second being an invaded zone and the third being a non-invaded formation. The resistances and dielectric constants of the borehole, the invaded zone, and the non-invaded formation are identified as $R_m$ and $\epsilon_m$; $R_{xo}$ and $\epsilon_{xo}$; and $R_t$ and $\epsilon_t$, respectively. In practicing one embodiment of the present invention, the phase difference is obtained from the reception of electromagnetic energy transmitted into the formation by transmitter X and received by receivers R2 and R3, while an amplitude ratio is obtained from the received electromagnetic energy by receivers R1 and R2.

Figure 2:
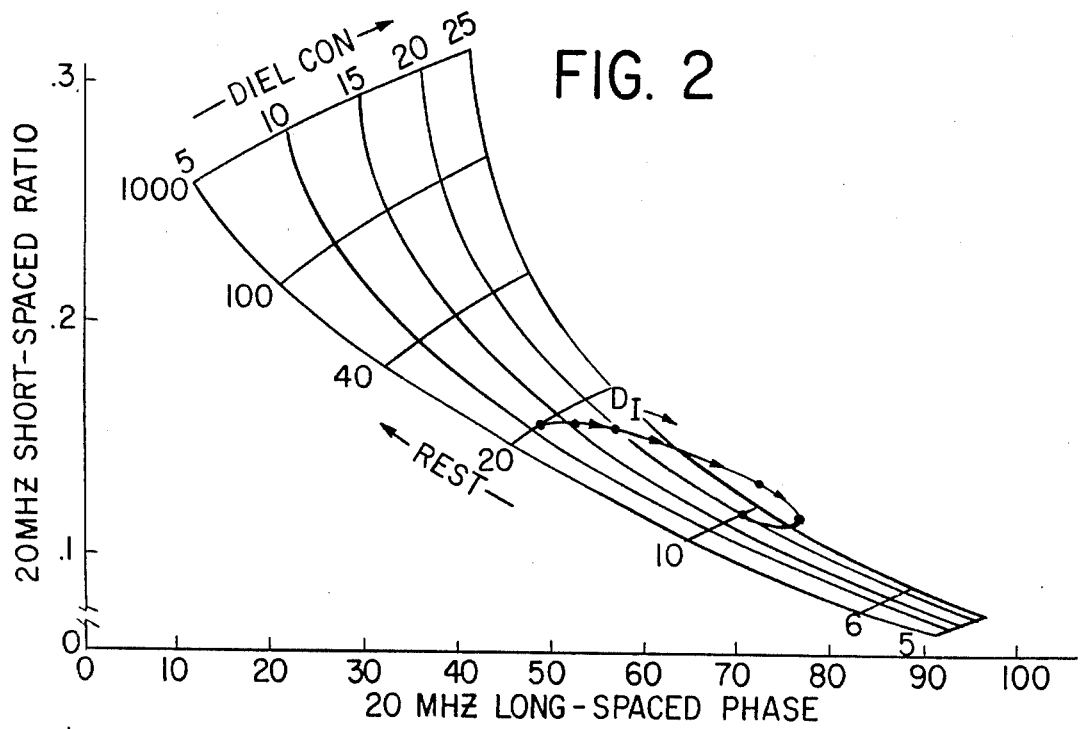
FIG. 2 is a plot of dielectric constant and resistivity of a short ratio, long phase well logging tool constructed in accordance with the present invention.
Figure 3:
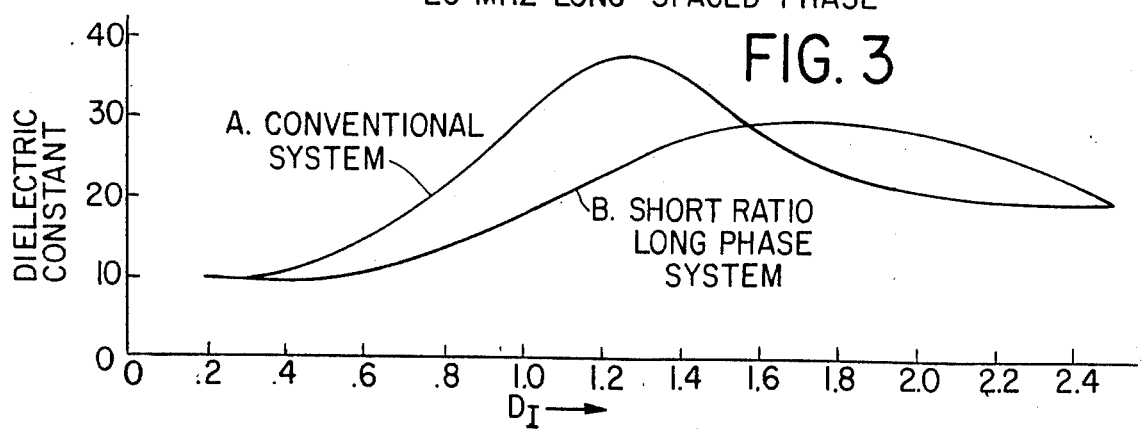
FIG. 3 is a plot of the response of a well logging tool constructed in accordance with the present invention along with the response of the well logging tool of a conventional system.

FIG. 2 is a plot of amplitude ratio versus phase difference of such a system which was obtained by computer using the well known Helmholtz wave equation which was disclosed in full in U.S. Pat. No. 4,107,598 and repetition here would not add to the disclosure of the present invention. The Helmholtz wave equation defines the behavior of a radio frequency field for a point source oscillating magnetic dipole in the center of a cylindrical borehole. Also shown in FIG. 2 is a computer generated plot of how an oil zone ($R_t = 20\Omega - m$, $\epsilon_t = 10$) is affected by typical, fresh mud invasion ($R_{xo} = 10\Omega - m$, $\epsilon_{xo} = 20$). This invasion response is compared to the conventional dielectric constant invasion response in FIG. 3.

The advantages of the short ratio, long phase well logging system over the conventional two receiver system, which is disclosed in the aforementioned U.S. Pat. No. 4,107,598, can be seen in FIG. 3 where receiver R1 was located 24 inches from the transmitter, while receiver R2 was located 40 inches from the transmitter, receiver R3 was located 56 inches from the transmitter. The two receiver sonde plot of dielectric constant versus diameter of the invaded zone is determined from receivers R1 and R2 which is the conventional method. The short ratio, long phase sonde of the present invention was obtained utilizing all three receivers as heretofore described. As can be seen, the present invention maintains its accuracy to a greater diameter of invasion.

Figure 4:
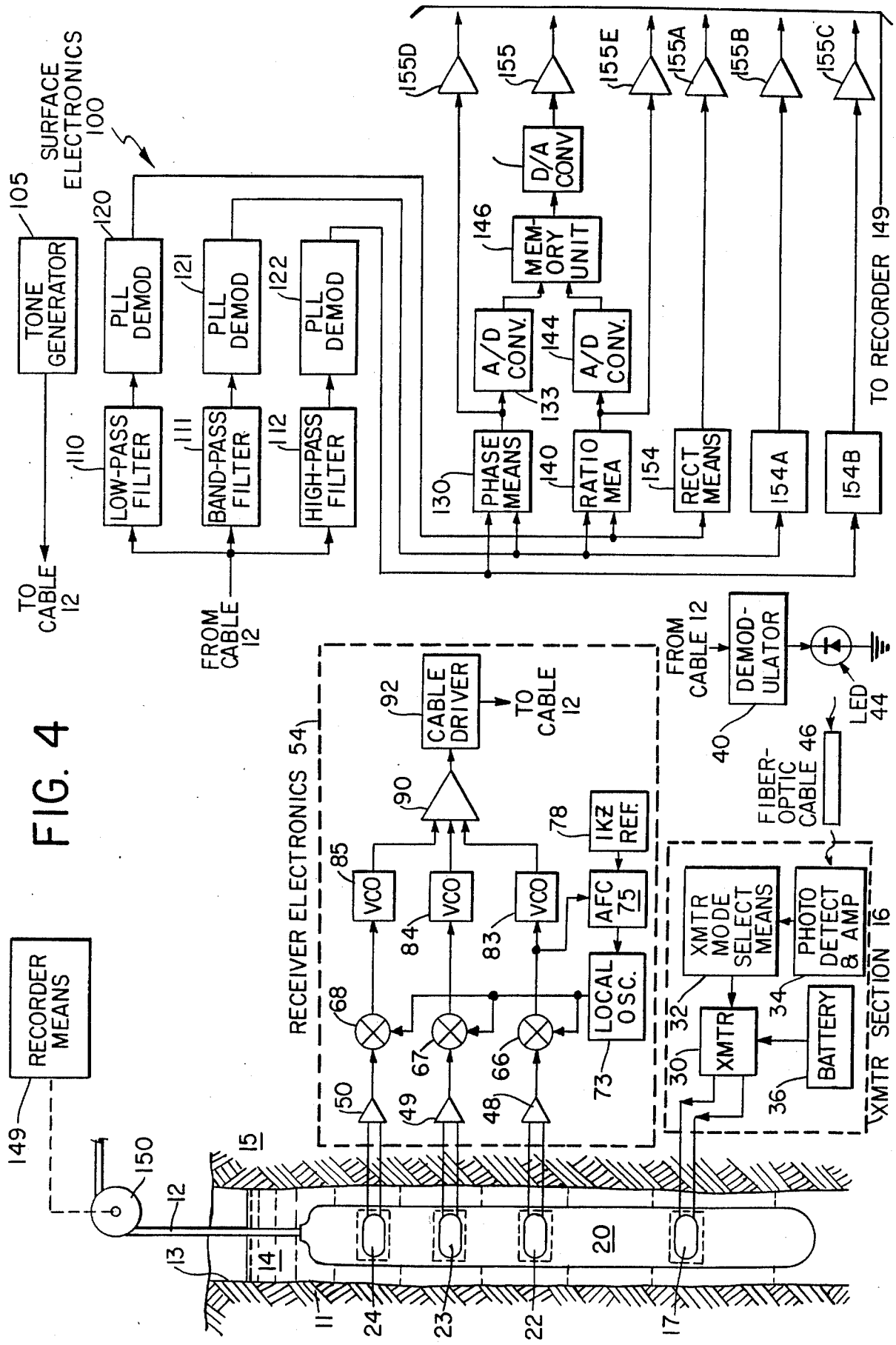
FIG. 4 is a simplified block diagram of a short ratio, long phase well logging system constructed in accordance with the present invention.

Referring now to FIG. 4, a well logging sonde 11 whose main body member is preferably constructed of fiberglass or some other non-conductive material of sufficient strength characteristics, is shown suspended by a well logging cable 12 in an uncased well borehole 13 filled with borehole fluid 14 and is surrounded by earth formations 15 whose dielectric constant and resistivity properties are to be measured. Within the lower portion of the well logging sonde 11 is housed a transmitter electronic section 16 and an associated transmitting coil 17. Transmitting coil 17 is a wire wound on a non-conducting machinable ceramic material. Transmitting coil 17 is energized at a RF frequency to transmit electromagnetic energy into earth formations 15. A preferred range of frequencies of transmission is 10 to 60 megahertz, while a preferred frequency within that range is 20 megahertz. Receiver coils 22, 23 and 24 which are helically wound on machinable ceramic forms comprise tuned resonant circuits which are sensitive to a frequency of 20 megahertz. Receiver coils 22, 23 and 24 are located 24, 40 and 56 inches, respectively, from transmitter coil 17 in sonde 11. Transmitter coil 17 and receiver coils 22, 23 and 24 are electrostatically shielded as indicated by the dotted line boxes around the coils. The coil spacings just recited are intended as being illustrative only and it will be appreciated by those skilled in the art that other operating frequencies in the range of interest for practicing the invention and other coil spacings than these may be used without departing from the inventive concept.

Transmitter section 16 includes a transmitter 30 which may be in an off state, a low power operational state, or a high power operational state as determined by an operator. Transmitter 30 is used to energize transmitter coil 17. Transmitter section 16 includes also transmitter mode select means 32 which provides a control signal to transmitter 30, to control the state of transmitter 30, in response from a signal from a photo detector and amplifier 34. Transmitter 30 is energized by DC voltage from battery 36. An operator at the surface determines the transmitter mode and provides, as hereinafter explained, a modulated signal down well logging cable 12 to a demodulator 40 located in the upper section of sonde 11 which demodulates the signal and provides it to a light emitting diode 44. Light emitting diode 44 provides a corresponding light output through a fiber optic cable 46 which passes through the coils 17, 22, 23 and 24 and is then converted back into an electrical signal by photo detector and amplifier 34 located in transmitter section 16. The purpose of using fiber optic cabling is to allow the state of transmitter 30 to be controlled without creating electromagnetic interference in receiver coils 22, 23 and 24.

The signals from coils 22, 23 and 24 are provided to amplifiers 48, 49 and 50, respectively, of receiver electronics 54. The outputs of receivers 48, 49 and 50 are provided to RF mixers 66, 67 and 68, respectively, where the 20 megahertz signals are heterodyned to a lower frequency preferably 1 kilohertz by action of a local oscillator 73. An automatic frequency control circuit 75 maintains the intermediate frequency locked to a frequency of 1 kilohertz reference signal provided by a 1 kilohertz reference source 78. The outputs of mixers 66, 67 and 68 are provided to voltage controlled oscillators 83, 84 and 85, respectively, which converts the mixers' signals to frequency modulated signals.

Voltage controlled oscillators 83, 84 and 85 provide frequency modulated signals having carrier frequencies of 20, 45 and 86 kilohertz, respectively. These carrier frequencies were chosen to provide adequate separation of the modulated carriers to allow for low pass, high pass and band pass filtering at the surface and further to fall within the maximum transmission capability of the logging cable. The frequency modulated signals provided by voltage controlled oscillators 83, 84 and 85 are provided to summing amplifier means 90 where they are summed and provided to a cable driver 92. Cable driver 92 provides the sum signal from summing means 90 to cable 12 which conducts it uphole to the surface electronics 100 on the surface.

As noted earlier, transmitter 30 may be in any one of three states. The transmitter operational state is selected at the surface to allow high power operation of transmitter 16 only while actual logging and calibrations are in process. This permits the standard battery pack to operate within its power capabilities while providing a factor of 10 increase in transmitter input power during logging. Transmitter 30 state is selected by sending a dual tone signal from tone generator 105 of surface electronics 100 to cable 12 where it is conducted downhole to demodulator 40 in sonde 11. As explained previously in the discussion of transmitter section 16, the signals are then conveyed to photo detector 34 via fiber optic cable and thence to transmitter mode select 32 which controls the mode of transmitter 30.

Surface electronics 100 also includes a low pass filter 110, a band pass filter 111, and a high pass filter 112 which filters the signal from cable 12 to provide reproductions of the signals from voltage control oscillators 83, 84 and 85, respectively to phase locked loop demodulators 120, 121 and 122, respectively. The output of phase locked loop demodulators 120, 121 and 122 are reproductions of the signals provided by receiver coils 22, 23 and 24, respectively, each signal having a frequency of 1 kilohertz.

The signals from phase locked loop demodulators 121 and 122 are provided to phase means 130 which provides a signal representative of the phase difference between the signals received by coils 23 and 24, or to put it another way, the phase difference between the signals received by the medium and long spaced receivers. The phase difference signal is applied to an analog to digital converter 133, which in turn provides a digital signal to a read only memory unit 135 of the electrically programmable type.

Ratio means 140 provides a signal representative of the ratio of the amplitudes of the radio frequency signals received by coils 22 and 23 in accordance with signals from phase locked loop demodulators 120 and 121, the ratio being the amplitude of the signal provided by phase locked demodulator 121, divided by the amplitude of the signal received by phase locked loop demodulator 120. The ratio signal provided by ratio means 140 is converted to a digital signal by an analog to digital converter 144 and provided to memory unit 135. Memory unit 135 provides a digital signal representative of the dielectric constant to a digital to analog converter 146 which converts it to an analog signal that is provided to an amplifier 155. Memory unit 135 contains the data which converts short-spaced ratio, long-spaced phase measurements to values of dielectric constant, as per FIG. 2. Amplifier 155 provides the amplified signal to a conventional recorder 149 controlled by a sheave wheel 150, over which the logging cable 12 passes. Recorder 149 records a dielectric constant trace as a function of borehole depth.

Phase locked loop demodulators 120, 121 and 122 provide their signals to rectifier means 154 through 154B, respectively, which provide signals to amplifiers 155A, 155B and 155C, respectively. Elements having the same numeric designation with different suffixes operate in a like manner as elements with the same numeric designations without suffixes. Amplifiers 155A, 155B and 155C provide trace signals to recorder 149 for traces of the short spaced receiver signal, the medium space receiver signal and the long spaced receiver signal, respectively. Phase means 130 and ratio means 140 provide signals to amplifiers 155D and 155E, respectively, which in turn provide trace signals to recorder 149.

The present invention as hereinbefore described is a short ratio, long phase resistivity and/or dielectric constant well logging system. The well logging system of the present invention is a one transmitter - three receiver system for use where there are fluid flooded earth formations to investigate.

What is claimed is:

1. A well logging sonde comprising:

transmitter means for transmitting electromagnetic energy into earth formations from a borehole, at a frequency which enables the electromagnetic energy to propagate through formations, three receiver means for receiving electromagnetic energy from the earth formations and providing corresponding receiver signals, each receiver means being spatially arranged at a different predetermined distance from the transmitter means, means for energizing the transmitter means to cause it to provide the electromagnetic energy into the formations, signal means for providing a signal related to the dielectric constant and conductivity of the earthen formation beyond that of a fluid invaded portion of the earthen formation to a well logging cable in accordance with the receiver signals from the receiver means, and housing means adapted to be passed through a borehole for housing the transmitter means, all the receiver means, the energizing means and the signal means; and said signal means includes:

three amplifying means, each amplifying means being connected to a corresponding receiving means while providing corresponding amplified signal, a reference signal means for providing a reference signal, automatic frequency control means receiving the reference signal for adjusting the reference signal to provide the adjusted reference signal, local oscillator means receiving the adjusted reference signal for providing a local oscillator signal, three mixer means, each mixer means being connected to a corresponding amplifier means and receiving the local oscillator signal from the local oscillator means for heterodyning the signals from the receiver means to a lower frequency and where the signal from one of the mixer means controls the automatic frequency control means to adjust the reference signal, and three voltage control oscillator means for frequency modulating the signals from the mixer means, each voltage controlled oscillator means being connected to a corresponding mixer means.

2. A well logging sonde as described in claim 1 in which the energizing means includes:

energizing circuit means for energizing the transmitter means, said energizing circuit means has three states: an off state, a low power operational state, or a high power operational state; and means for controlling the state of the energizing circuit means in accordance with a signal from the well logging cable.

* * * * *